United States Patent [19]
Cross et al.

[11] 3,910,896
[45] Oct. 7, 1975

[54] SUBSTITUTED PHENOXYALKYLAMINES AS GASTRIC ANTI-SECRETORY AGENTS

[75] Inventors: Peter E. Cross, Canterbury; James R. Stichbury, Harbledown, near Canterbury; Eric F. Thorpe, Birchington, all of England; Neil M. Scollick, New London, Conn.

[73] Assignee: Pfizer Inc., New York, N.Y.

[22] Filed: Mar. 23, 1973

[21] Appl. No.: 344,426

Related U.S. Application Data

[62] Division of Ser. No. 122,253, March 8, 1971, Pat. No. 3,751,470.

[30] Foreign Application Priority Data
Mar. 13, 1970  United Kingdom............... 12111/70

[52] U.S. Cl. ...... 260/240 R; 260/239 B; 260/243 B; 260/247.7 C; 260/268 R; 260/293.83

[51] Int. Cl.$^2$......................................... C09B 23/00
[58] Field of Search ......... 260/240 R, 570.7, 239 B, 260/243 B, 247.7 C, 268 R, 293.83

[56] References Cited
UNITED STATES PATENTS

| | | | |
|---|---|---|---|
| 3,340,192 | 9/1967 | Henley.................... | 260/570.7 X |
| 3,709,892 | 1/1973 | Leeming et al............ | 260/293.83 |
| 3,746,768 | 7/1973 | Bordenca et al........... | 260/570.7 X |
| 3,751,470 | 8/1973 | Cross et al................ | 260/570.7 X |

*Primary Examiner*—John D. Randolph
*Attorney, Agent, or Firm*—Connolly and Hutz

[57] ABSTRACT

Novel ortho-substituted phenoxyalkylamines having gastric anti-secretory activity are prepared. A typical embodiment is N,N-diethyl-2-[2-(2-cyclohexylvinyl)-phenoxy]ethylamine.

5 Claims, No Drawings

SUBSTITUTED PHENOXYALKYLAMINES AS GASTRIC ANTI-SECRETORY AGENTS

CROSS REFERENCE TO RELATED APPLICATION

This application is a division of application Ser. No. 122,253 filed Mar. 8, 1971, now U.S. Pat. No. 3,751,470, granted Aug. 8, 1973.

BACKGROUND OF THE INVENTION

This invention relates to compounds having antihistamine activity, and is particularly concerned with a novel class of ortho-substituted phenoxyalkylamines which are capable of selectively inhibiting gastric acid secretion without causing bronchial constriction or other side effects. These compounds are therefore useful in the treatment of peptic ulcers and other conditions caused or exacerbated by gastric hyperacidity.

SUMMARY OF THE INVENTION

The novel compounds disclosed herein are selected from the group consisting of ortho-substituted phenoxyalkylamines of the formula:

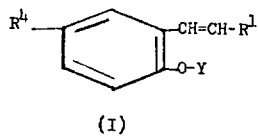

(I)

and the pharmaceutically acceptable acid addition salts thereof wherein $R^1$ is alkyl or cycloalkyl of from 5 to 8 carbon atoms; Y is aminoalkyl of the formula —Alk—$NR^2R^3$, in which $R^2$ and $R^3$ taken separately are each lower alkyl and $R^2$ and $R^3$ taken together with the nitrogen atom to which they are attached form a pyrrolidino, piperidino, morpholino, thiomorpholino, piperazino, azepino or diazepino group and 'Alk' represents a divalent alkyl group containing from 2 to 4 carbon atoms, the free valences being located on different carbon atoms;

or Y is an amino-cyclic group of the formula

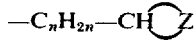

in which n is 0 to 3 and Z is a divalent group which completes a pyrrolidine, piperidine, morpholine, thiomorpholine, piperazine, azepine, or diazepine ring, the nitrogen atom in said ring being separated from the oxygen atom to which the amino-cyclic group is attached, by a chain of from 2 to 4 carbon atoms;

and $R^4$ is hydrogen, halogen, lower alkyl or lower alkoxy.

In addition, there is disclosed a composition in dosage unit form useful for alleviating excess gastric acid secretion in a host comprising a pharmaceutical carrier and from about 2.5 mg. to about 250 mg. (expressed as the weight of the free base) of a compound having the formula:

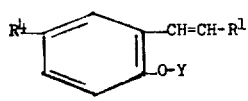

and the pharmaceutically acceptable acid addition salts thereof wherein $R^1$ is alkyl or cycloalkyl of from 5 to 8 carbon atoms; Y is aminoalkyl of the formula —Alk—$NR^2R^3$, in which $R^2$ and $R^3$ taken separately are each lower alkyl and $R^2$ and $R^3$ taken together with the nitrogen atom to which they are attached form a pyrrolidino, piperidino, morpholino, thiomorpholino, piperazino, azepino or diazepino group and 'Alk' represents a divalent alkyl group containing from 2 to 4 carbon atoms, the free valences being located on different carbon atoms;

or Y is an amino-cyclic group of the formula

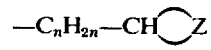

in which n is 0 to 3 and Z is a divalent group which completes a pyrrolidine, piperidine, morpholine, thiomorpholine, piperazine, azepine or diazepine ring, the nitrogen atom in said ring being separated from the oxygen atom to which the amino-cyclic group is attached, by a chain of from 2 to 4 carbon atoms;

and $R^4$ is hydrogen, halogen, lower alkyl or lower alkoxy.

The term "lower," applied to a substituent group, means containing from 1 to 4 carbon atoms, and "halogen" means fluorine, chlorine, bromine or iodine.

DETAILED DESCRIPTION OF THE INVENTION

In the general formula, $R^1$ may be a straight or branched chain group, or may be or contain a cyclic group. For example, it may be a straight or branched chain pentyl, hexyl, heptyl or octyl group, or a cyclohexyl, cyclohexyl-methyl or cyclo-heptyl group. Preferably it is a n-pentyl, n-hexyl or cyclohexyl group.

$R^2$ and $R^3$ may each be, for example, a methyl, ethyl, propyl or butyl group, or together with the nitrogen atom may form, for example, a pyrrolidino, piperidino, morpholino, thiomorpholino, piperazino, azepino or diazepino group. When $R^2$ and $R^3$ form with the nitrogen atom a saturated heterocyclic group which contains a further nitrogen atom, then such further nitrogen preferably carries a lower alkyl or benzyl group as substituent.

When Y is an —Alk—$NR^2R^3$ group, —Alk—may be, for example, an ethylene, propylene, ethyl-substituted ethylene, dimethyl-substituted ethylene, trimethylene or tetramethylene group.

When Y is a

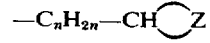

group, —$C_nH_{2n}$— may be, for example, a methylene, ethylidene, ethylene, propylene or trimethylene group, and the heterocyclic ring completed by Z may be, for example, a pyrrolidine, piperidine, morpholine, thiomorpholine, piperazine, azepine or diazepine ring, provided that any nitrogen atom in the ring is separated by at least two carbon atoms from the oxygen atom to which the group is attached.

Thus, —$C_nH_{2n}$—CH$Z$ may be, for example, a 3-pyrrolidinyl or 3- or 4-piperidinyl group, a 2- or 3-pyrrolidinylmethyl or 2-,3- or 4-piperidinylmethyl group, a 2-(2- or 3-pyrrolidinyl)ethyl or 2-(2- or 3-piperidinyl)ethyl group, or a 3-(2-pyrrolidinyl)propyl or 3-(2-piperidinyl)propyl group. Any nitrogen atom in Z is preferably substituted with a lower alkyl or benzyl group while any carbon atom in Z may be substituted with a lower alkyl group.

Pharmaceutically-acceptable acid-addition salts of the compounds of the invention can be prepared from acids which form non-toxic addition salts containing pharmaceutically-acceptable anions, such as the hydrochloride, hydrobromide, hydroiodide, sulfate or bisulfate, phosphate or acid phosphate, acetate, maleate, fumarate, oxalate, lactate, tartrate, citrate, gluconate, saccharate, and p-toluene sulfonate salts.

Particularly preferred salts of compounds of this invention which are convenient in that they are soluble in the common solvents, are the addition salts formed with polycarboxylic acids, e.g. citric, tartaric, maleic, fumaric and oxalic acids.

The compounds of the invention may be prepared in a number of ways:

(1) All the compounds of the invention can be prepared from the appropriate ortho-substituted phenol, of the formula:

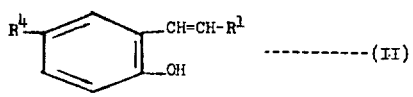   (II)

by (a) reaction with an alkali metal compound in an inert solvent to form the alkali metal phenate and then with the appropriate halide, of the formula: hal—Alk—NR$^2$R$^3$ or hal—C$_n$H$_{2n}$—CH⟨Z where 'hal' represents a halogen atom, to yield the required product direct;

or (b) reaction with a compound of the formula: hal—Alk—Q, where Q is halogen or an aryl sulfonyloxy group, to form a compound of the formula:

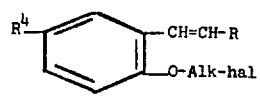

which is then reacted with the appropriate secondary amine HNR$^2$R$^3$;

or (c) reaction with a halo-alkanol of the formula: hal—Alk—OH under similar conditions to (b) to form a compound of the formula:

which is converted to the halide, e.g. by reaction with thionyl chloride, and then reacted with the appropriate secondary amine as in (b).

In the method 1 (a), the inert solvent may, for example, be toluene or dimethyl formamide. The formation of the phenate may be carried out by adding sodium hydride cautiously to the solution of the phenol and then heating. Alternatively, the alkali metal phenate may be produced in an inert solvent, e.g. methyl iso-butyl ketone, in the presence of an alkali metal base, e.g., potassium carbonate. Reaction with the halide (e.g., the chloride) may be carried out at reflux temperature.

In methods 1 (b) and 1 (c), the reaction of the phenol with the compound hal—Alk—Q or with the halo-alkanol (e.g., bromo-alkanol) may be carried out under reflux in an inert solvent, e.g., methanol or ethanol, in the presence of a base, e.g. potassium hydroxide or sodium ethoxide. The subsequent reaction with the secondary amine may be carried out in any suitable inert solvent, e.g., ethanol, under reflux conditions, or in a sealed bomb at an elevated temperature.

(2) Compounds of the invention in which R$^4$ is a hydrogen atom or an alkyl or alkoxy group may also be prepared from a salicylaldehyde derivative of the formula:

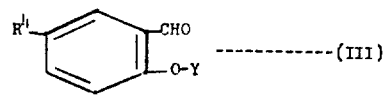   (III)

by the Grignard reaction with magnesium and a halide of the formula hal—CH$_2$—R$^1$, to form the carbinol of the formula:

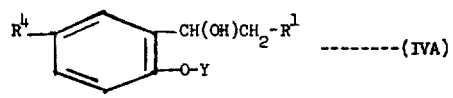   (IVA)

and the carbinol compound is either dehydrated, of halogenated and then dehydrohalogenated, to yield the desired product. Alternatively, the carbinol of the formula (IVA) or of the formula:

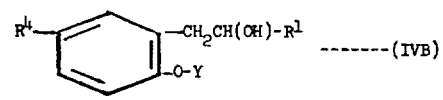   (IVB)

may be formed by the Grignard reaction of an aldehyde of the formula R$^1$—CH$_2$CHO or R$^1$—CHO with magnesium and a compound of the formula:

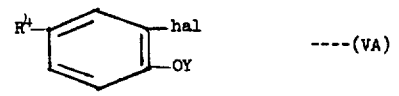   (VA)

or

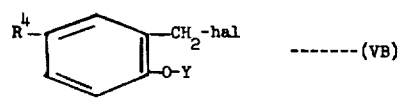   (VB)

respectively, and the carbinol compound is either dehydrated, or halogenated and then dehydrohalogenated, as before, to yield the desired product.

In this method, the Grignard reagent is prepared in the usual way from magnesium and the appropriate halide in a suitable solvent, e.g., diethyl ether, and the appropriate aldehyde is then added slowly in the same solvent to the cooled solution of the Grignard reagent. The mixture is then heated to complete the reaction and the magnesium complex decomposed with acid at about 0°C.

The dehydration reaction may be carried out be heating the carbinol of either of the formulae (IVA) and (IVB) in the presence of strong acid, e.g., p-toluene sulfonic acid.

The halogenation reaction may, for example, be effected with thionyl chloride such that the carbinol of the formula (IVA) is converted to a chloro-compound of the formula:

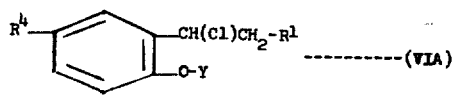   (VIA)

or the carbinol of the formula (IVB) is converted to a chloro-compound of the formula:

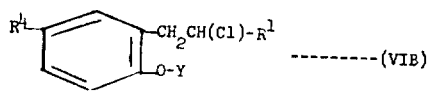

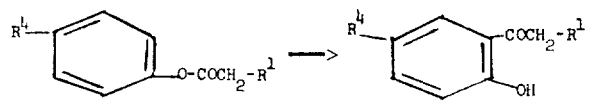

The subsequent dehydrohalogenation stage may then be effected merely by heating the corresponding halide in the presence of acid if necessary.

(3) Compounds of the invention in which $R^4$ is a hydrogen atom or an alkyl or alkoxy group may also be prepared from a salicylaldehyde derivative of the formula (III) by reaction with lithium and halide of the formula $R^1CH_2$—hal, to form the carbinol of the formula (IVA), and, as in method (2), the carbinol compound is either dehydrated, or halogenated and then dehydrohalogenated, to yield the desired product.

In this method a mixture of the salicylaldehyde derivative and the halide is added to a stirred suspension of lithium in a dry inert solvent, e.g., tetrahydrofuran with cooling such that the temperature of the mixture does not rise above about 40°C. The mixture is stirred at room temperature for several hours afther the addition, and then is hydrolyzed by cautious addition of water and extracted with a suitable solvent, e.g., diethyl ether. The crude product, an oil, is obtained on evaporating the organic solution, and is submitted to a reduced-pressure distillation, whereupon the pure carbinol product is isolated.

Subsequent dehydration, or halogenation and dehydrohalogenation, as described in the previous method (2), converts the carbinol to the desired substituted ethylene product.

(4) The compounds of the invention may also be prepared from an ortho-acyl phenol of the formula:

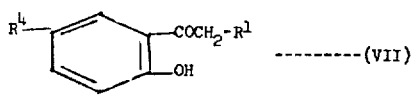

by reaction according to any of the preparations 1 (a), (b) or (c) to produce a compound of the formula:

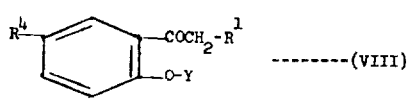

The compound (VIII) is then converted to the carbinol of the formula (IVA) already given above, i.e.

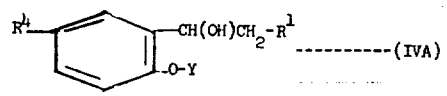

by reaction with a suitable reducing agent, e.g., sodium borohydride, in an inert solvent, e.g. ethanol, under reflux, and the carbinol is subsequently converted to the vinylene compound (I) either by conversion to the halo-compound followed by dehydrohalogenation or directly by dehydration, according to the procedure described in method (2).

The starting materials in this method, i.e., acyl phenols of the formula (VII), can be readily prepared from the corresponding phenyl carboxylate by the Fries rearrangement reaction, with aluminum chloride or similar Lewis acid catalysts:

When $R^4$ is hydrogen, however, the reaction gives a mixture of ortho and para isomers which must be separated to give the required ortho-acyl phenol. Such separations may be effected in various ways, e.g., by steam distillation, fractional distillation or fractional crystallization. Alternatively, the acyl phenols may be prepared by the Friedel-Crafts reaction between a 4-$R^4$-phenol and a carboxylic acid of the formula $R^1$—$CH_2COOH$ in a suitable inert solvent, e.g., o-dichlorobenzene in the presence of a Lewis acid catalyst, e.g., aluminum chloride.

In each of the above methods for preparing the compounds of the invention, the product may be obtained as free base by precipitation or by removal of solvent under reduced pressure, and purified by addition of water (made just basic if necessary to avoid precipitation), extraction into ether, drying, filtration and evaporation under reduced pressure. Acid addition salts may be obtained in the usual manner by addition of the appropriate acid in a suitable solvent, e.g. diethyl ether, to the liquid base, or a solution thereof if solid, and collection of the precipitate. Purification is carried out in the usual manner by recrystallization from a suitable solvent.

The compounds of the invention all exist as cis and trans forms relative to the ethylenic double bond and the invention includes the separated cis and trans forms as well as mixtures of the isomers. In all of the described processes, the product is ordinarily obtained as the more stable trans form.

Compounds of the invention containing an asymmetric center, e.g., those in which $R^1$ or Y contains an asymmetric carbon atom, also exist in D- and L-optically active isomeric forms and the invention includes these forms as well as the racemic mixtures. In the described processes, products which contain an asymmetric center are obtained as the racemic mixtures, unless an optically active starting material is used. The product of Example 4, for instance, in which the 2-carbon atom of the piperidinyl group is asymmetric, is a racemic mixture of D- and L-forms.

The compounds of the invention have been found to have an inhibiting effect on histamine-induced gastric acid secretion which has been measured in experimental animals. In one of such tests, anaesthetised rats are sensitized by intravenous injection of carbachol (carbamoyl choline chloride) and are then injected intravenously with a standard dose of histamine and the pH of the gastric contents is measured over a short period, until it stabilizes. The test compound is then administered, also intravenously, and the pH of the gastric contents is measured over a further period, until the inhibiting effect of the compound is no longer apparent. A 50% inhibition of the effect of histamine on pH, at a dose of 10 mg/kg has been found for many of the compounds of the invention, while the most potent have at least 100% inhibiting effect at 2.5 mg/kg or even less. The more potent compounds are also effective over a period of 3 to 4 hours after injection. In a similar test with anaesthetized cats, histamine is continuously infused before and during administration of the test compound.

The most effective compounds have been found to be those having the formula in which $R^1$ is a n-pentyl, n-hexyl or cyclohexyl group, $R^4$ is a hydrogen or chlorine atom, and Y is a group of the formula —AlK—$NR^2R^3$ or —$C_nH_{2n}$-CH  Z (as hereinbefore defined) which contains (1) a single, tertiary nitrogen atom separated from the oxygen atom by a chain of two carbon atoms only, (2) a total of from 6 to 9 carbon atoms and (3) a methylene group attached to the oxygen atom.

The compounds of the invention can be administered alone, but will generally be administered in admixture with a pharmaceutical carrier selected with regard to the intended route of administration and standard pharmaceutical practice. For example, they may be administered orally in the form of tablets containing such excipients as starch and lactose, or in capsules either alone or in admixture with excipients, or in the form of elixirs or suspensions containing flavoring or coloring agents. They may be injected parenterally, for example, intramuscularly or subcutaneously. For parenteral administration, they are best used in the form of a sterile aqueous solution which may contain other solutes, for example, enough salts or glucose to make the solution isotonic.

With respect to dosage levels, a broad dosage range of 2.5 to 250 mg/day for adults is appropriate, a particularly preferred range being from 10 mg to 100 mg/day. The physician in any event will determine the actual dosage which wi'l be most suitable for an individual patient and it wi,l vary with age, the weight and response of the particular patient. The above dosages are exemplary of the average host. There can, of course, be individual cases where higher or lower dosage ranges are merited, and such are within the scope of this invention.

The invention is illustrated by the following examples.

EXAMPLE I

A. Cyclohexylmethylmagnesium bromide (35.4 g., 0.2 M) was prepared in ether (610 ml.) in the usual manner from cyclohexylmethyl bromide and magnesium. 2-Diethylaminoethoxy benzaldehyde (44.2 g., 0.2 M) in ether (60 ml.) was added slowly to the cooled Grignard reagent. At the completion of the addition the mixture was heated under reflux for 3 hours, and then decomposed with 5N hydrochloric acid in the presence of ice. The free base of the product was liberated by the addition of ammonium chloride (42.8 g.) and dilute ammonia and the separated ethereal layer removed. The aqueous phase was extracted further with ether (150 ml. total) and the ether extracts pooled and washed with dilute ammonia. Ether was removed by evaporation on a water bath and the residual oil distilled in vacuo. The fraction of b.p. 180°–186°C/0.3 mm (29.8 g.) was shown to consist of 95% pure N,N-diethyl-2-[2-(2-cyclohexyl-1-hydroxyethyl)phenoxy]ethylamine as free base. A small quantity (3.19 g.) of the free base was dissolved in ether (75 ml.) and treated with ethanolic HCl (1 ml., 1.0 N) to convert it to the hydrochloride (3.3 g.), m.p. 169°–170°C.

Analysis: Found: C, 67.16: H, 9.86; N, 3,83; Cl, 9.65%

Calcd. for $C_{20}H_{33}NO_2$.HCl: C, 67.49; H, 9.62; N, 3.94; Cl, 9.96%

B. The product of (A) (25.0 g. as free base), was dissolved in benzene (50 ml.) and thionyl chloride (10.4 g.) added dropwise with cooling. The solution was heated under reflux for 1 hour, cooled and shaken briefly with 10% sodium carbonate solution (80 ml.). Benzene was removed on the water bath and the residual oil heated in vacuo to 160°C. for about 15 minutes during which time the contents of the flask partially solidified. The product was dissolved in water (150 ml.) adjusted to pH 10.0 with dilute ammonia and the separated oil recovered by extraction with ether (3 × 50 ml.). Ether was removed on the water bath and the resulting oil distilled in vacuo, the fraction (18.0 g.) b.p. 160°–165°C/0.5 mm. being collected. Of this fraction, 17.0 g. were dissolved in ether (350 ml.) and the solution treated with ethanolic HCl (5.5 ml., 9.5 N) yielding 17.4 g. of the crude hydrochloride of N,N-diethyl-2-[2-(2-cyclohexylvinyl)phenoxy]ethylamine, m.p. 168°–169°C. Recrystallization from ethyl acetate gave the pure hydrochloride, m.p. 169°–170°C.

Analysis: Found: C, 70.76; H, 9.78; N, 3.92; Cl, 10.87%

Calcd. for $C_{20}H_{32}NO$.HCl; C, 71.2; H, 9.5; N, 4.15; Cl, 10.5%

EXAMPLES II TO IV

The following compounds were prepared by the method described in Example I, starting from the appropriately substituted salicylaldehyde derivative and cyclohexylmethylmagnesium bromide, and characterized as the hydrochloride.

| Example | Y | m.p. of hydrochloride | Analysis (Calculated in brackets) | | |
|---|---|---|---|---|---|
| | | | %C | %H | %N |
| II | —$CH_2CH_2N$⟨ ⟩ | 163–4°C | 72.46 (71.50 | 9.24 9.01 | 3.94 4.17) |
| III | —$(CH_2)_3N(CH_3)_2$ | 124–5°C | 70.46 (70.46 | 8.99 9.34 | 4.25 4.33) |
| IV | —$CH_2$—⟨N-$CH_3$⟩ | 196–8°C | 72.18 (72.08 | 9.00 9.23 | 3.61 4.01) |

EXAMPLE V

A. Lithium wire (0.79 g. 0.055 M) was cut into small pieces and suspended in dry tetrahydrofuran (30 ml.). A mixture of 2-(2-pyrrolidinoethoxy)benzaldehyde (11.0 g. 0.05 M) and 1-bromoheptane (9.9 g. 0.055 M) was added to the stirred suspension with occasional cooling such that the temperature did not rise above 40°C. The mixture was stirred at room temperature for a further 3 hours after completion of addition, and then hydrolyzed by cautious addition of water, the whole mixture then being ether extracted. Evaporation of the ethereal solution afforded an oil which was submitted to two distillations in vacuo, a portion (1.50 g.) of the fraction (6.95 g). b.p. 198°–202°C/0.8 mm of the second distillation being converted by conventional means to the citrate salt. This was recrystallized from ethanol/diethyl ether twice to yield a pure sample (1.65 g.) of 1-[2-(1-hydroxy-n-octyl) phenoxy]-2-pyrrolidinoethane citrate, m.p. 130°–132°C.

Analysis: Found: C, 60.65; H, 7.8; N, 2.65%
Calcd. for $C_{20}H_{33}NO_2.C_6H_8O_7$: C, 61.05; H, 8.08; N, 2.74%

B. The product of (A) (5.0 g. as free base) and p-toluene sulfonic acid (6.0 g.) were dissolved in dry toluene (100 ml.) and the solution was refluxed (in Dean and Stark apparatus) for 3 hours. The solution was then cooled, washed with water, sodium hydroxide solution and water again, and dried over anhydrous sodium sulfate. Evaporation of the solution gave an oil which was submitted to a reduced-pressure distillation, the fraction (2.45 g.) b.p. 187°–192°C/0.8 mm then being redistilled to give a fraction (2.0 g.) b.p. 187°–189°C/1.0 mm. The product was converted by conventional means to the citrate salt, which was recrystallized from ethanol/diethyl ether to yield a pure sample (3.0 g.) of 1-[2-(2-n-hexylvinyl)phenoxy]-2-pyrrolidinoethane citrate, m.p. 103°–105°C.

Analysis: Found: C, 62.91; H, 7.66; N, 2.75%
Calcd. for $C_{20}H_{31}NO.C_6H_8O_7$: C, 63.28; H, 7.97; N, 2.84%

EXAMPLE VI

By the method of Example V, starting from lithium, 2-(2-pyrrolidinoethoxy)benzaldehyde and 1-bromohexane, 1-[2-(2-n-pentylvinyl)phenoxy]-2-pyrrolidinoethane citrate, m.p. 102°–103.5°, was similarly prepared.

Analysis: Found: C, 62.60; H, 7.69; N, 2.70%
Calcd. for $C_{19}H_{29}NO.C_6H_8O_7$: C, 62.62; H, 7.78; N, 2.92%

EXAMPLE VII

A. To a stirred suspension of anhydrous aluminum chloride (300 g. 2.25 M) in o-dichlorobenzene (500 ml.) at 110°C was slowly added a solution of cyclohexylacetic acid (142 g. 1.0 M) and p-chlorophenol (128 g. 1.0 M) in o-dichlorobenzene (250 ml.). When the addition had been completed, the temperature of the mixture was raised to 180°C. and maintained at this point for 12 hours.

The mixture was then cooled and quenched on a mixture of ice and concentrated hydrochloric acid, steam distilled to remove o-dichlorobenzene, and the aqueous solution extracted with chloroform. The organic extracts were dried over anhydrous sodium sulfate and evaporated down to a brown oil, which solidified on standing. The product (234 g. 92.5% theoretical yield), m.p. 63°–4°C was 4-chloro-2-cyclohexylacetylphenol.

B. The product of (A) (232 g., 0.92 M), 2-benzenesulfonyloxyethyl chloride (445 g., 2.02 M), potassium carbonate (254 g., 1.84 M) and potassium iodide (46 g.) were added to methyl iso-butyl ketone (1.8 l.) and the mixture stirred and refluxed for 24 hours.

The mixture was then cooled to room temperature and the undissolved material collected by filtration and washed with methyl iso-butyl ketone, the washings then being combined with the original methyl iso-butyl ketone reaction solution. Evaporation of the total solution afforded a brown oil which solidified on standing. Recrystallization of the crude product (330 g.) from iso-propanol yielded a purer sample (200 g. 69% theoretical yield) of 2-(4-chloro-2-cyclohexylacetylphenoxy)ethyl chloride as an off-white solid, m.p. 71.5°–73.5°C.

C. The product of (B) (200 g., 0.635 M), pyrrolidine (180 g., 2.54 M) and industrial methylated spirit (700 ml.) were heated together in a sealed bomb at 100°C for 20 hours. The mixture was then cooled and the solvent evaporated off, yielding a brown oil. The latter was dissolved on 5N hydrochloric acid, and the solution extracted with diethyl ether, the product as its hydrochloride salt largely being retained in the aqueous solution. The acid solution was basified with sodium hydroxide solution and extracted several times with diethyl ether, the combined ethereal extracts then being dried over anhydrous magnesium sulfate and evaporated down to yield a brown oil (222 g.). This was dissolved in methanol (500 ml.), and a solution of oxalic acid (55.5 g.) in methanol (250 ml.) added. Some precipitation of solid resulted, and more was induced by addition of diethyl ether (3 l.). The light brown precipitate was filtered off, dried in air over several hours, and recrystallized from industrial methylated spirit to yield a cream-colored solid. This was washed with industrial methylated spirit and dried, giving 170 g. of 1-(4-chloro-2-cyclohexylacetylphenoxy)-2-pyrrolidinoethane oxalate, m.p. 161°–3°C.

Analysis: Found: C, 59.72; H, 6.75; N, 3.01%
Calcd. for $C_{20}H_{28}ClNO_2.C_2H_2O_4$: C, 60.05; H, 6.83; N, 3.19%

D. The product of (C) was converted to the free base by basification of the aqueous solution of the oxalate, extraction with diethyl ether, and evaporation of the ethereal solution to dryness. To the free base (120 g., 0.343 M) dissolved in ethanol (500 ml.) was added sodium borohydride (11.7 g., 0.3 M) dissolved in ethanol (1 l.) dropwise over 20 minutes. The reaction mixture, which had become slightly warmer during the addition, was stirred for 15 minutes at room temperature, refluxed for 1 hour, and then cooled to room temperature. A small amount of white precipitate was removed by filtration and the filtrate evaporated down to a yellow oil and some solid. This was stirred in water, the solution basified, extracted with chloroform, and the chloroform extracts dried over magnesium sulfate and evaporated down to a light brown oil (121 g.).

The hydrochloride salt of a small sample of the product was formed by admixture of the free base with hydrogen chloride in an ethyl acetate-industrial methylated spirit solution and collection of the resultant precipitate by filtration. The product was 1-[4-chloro-2-(1-hydroxy-2-cyclohexylethyl)phenoxy]-2-pyrrolidinoethane hydrochloride, m.p. 168°–171°.

Analysis: Found: C, 61.85; H, 7.99; N, 3.61%

Calcd. for $C_{20}H_{30}ClNO_2.C_2H_2O_4$: C, 62.33; H, 8.20; N, 3.69%

E. The product of (D) as the free base was converted to the vinylene compound, 1-[4-chloro-2-cyclohexylvinyl)phenoxy]-2-pyrrolidinoethane, by the dehydration method similar to that described in Example V (B). The product was characterized as the hydrochloride salt, m.p. 179°–181°C.

Analysis: Found: C, 65.27; H, 8.09; N, 3.52; Cl, 19.04%

Calcd. for $C_{20}H_{28}ClNO.C_2H_2O_4$: C, 64.86; H, 7.89; N, 3.78; Cl, 19.14%

EXAMPLE VIII

A. 4-Chloro-2-cyclohexylacetylphenol (230 g., 0.91 M), produced as in Example VII (A), was mixed with 2-diethylaminoethyl chloride hydrochloride (186.7 g. 1.085 M), potassium carbonate (300 g., 2.18 M), potassium iodide (44.8 g., 0.265 M) and methyl iso-butyl ketone (1.8 l.) and the mixture was refluxed with stirring for 12 hours. The mixture was cooled to room temperature, and the undissolved material filtered off and washed with methyl iso-butyl ketone, the washings then being combined with the main filtrate. Evaporation of the solution afforded a brown oil (300 g.) and this was dissolved in 5N hydrochloric acid and the aqueous solution extracted with diethyl ether. The acid solution was basified with dilute sodium hydroxide solution, extracted with chloroform, and the chloroform solution dried with magnesium sulfate and evaporated down to a brown oil (261.5 g., 81.5% theoretical yield), which was N,N-diethyl-2-(4-chloro-2-cyclohexylacetylphenoxy)ethylamine.

The product was characterized as the citrate salt, m.p. 123.5°–125.5°C.

Analysis: Found: C, 57.45; H, 6.97; N, 1.91%

Calcd. for $C_{20}H_{30}ClNO_2.C_6H_8O_7$: C, 57.43; H, 6.99; N, 2.57%

B. The product of (A) as free base was reduced to the carbinol, N,N-diethyl-2-[4-chloro-2-(2-cyclohexyl-1-hydroxyethyl)-phenoxy]ethylamine, by the method similar to that described in Example VII (D), and the carbinol product converted to the vinylene compound, N,N-diethyl-2-[4-chloro-2-(2-cyclohexylvinyl)phenoxy]ethylamine by the dehydration method similar to that described in Example V (B). The final product was characterized as the hydrochloride salt, m.p. 158°–9°C.

Analysis: Found: C, 64.40; H, 8.42; N, 3.49; Cl, 10.70%

Calcd. for $C_{20}H_{30}ClNO.HCl$: C, 64.50; H, 8.39; N, 3.76; Cl, 9.52%

EXAMPLE IX

Formulation of tablets and capsules of N,N-diethyl-2-[2-(2-cyclohexylvinyl)phenoxy]ethylamine hydrochloride described in Example I is effected using the following ingredients:

| Tablets | mg/tablet |
|---|---|
| N,N-diethyl-2-[2-(2-cyclohexylvinyl) phenoxy]ethylamine hydrochloride | 11.2 * |
| Dicalcium phosphate | 120.0 |
| Corn starch | 20.0 |
| Magnesium stearate | 1.6 |
| Sodium lauryl sulfate | 0.2 |

* equivalent to 10 mg. of free base

The ingredients are blended and compressed. The compressed pieces are then broken into granules and compressed into finished tablets.

| Capsules | mg/tablet |
|---|---|
| N,N-diethyl-2-[2-cyclohexylvinyl) phenoxy]ethylamine hydrochloride | 11.2 * |
| Corn starch | 127.0 |
| Microcrystalline cellulose | 127.0 |
| Magnesium stearate | 5.4 |
| Sodium lauryl sulfate | 0.6 |

* equivalent to 10 mg. of free base.

The ingredients are blended and filled into hard gelatin capsules of suitable size.

What is claimed is:

1. A compound of the formula:

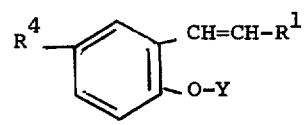

and the pharmaceutically acceptable acid addition salts thereof wherein $R^1$ is alkyl or cycloalkyl of from 5 to 8 carbon atoms; Y is aminoalkyl of the formula —Alk—$NR^2R^3$, in which $R^2$ and $R^3$ taken together with the nitrogen atom to which they are attached form a pyrrolidino, piperidino, morpholino, thiomorpholino, piperazino, azepino or diazepino group and 'Alk' represents a divalent alkyl group containing from 2 to 4 carbon atoms, the free valences being located on different carbon atoms;

or Y is an amino-cyclic group of the formula —$C_nH_{2n}$—CH Z which $n$ is 0 to 3 and Z is a divalent group which completes a pyrrolidine, piperidine, morpholine, thiomorpholine, piperazine, azepine or diazepine ring, the nitrogen atom in said ring being separated from the oxygen atom to which the aminocyclic group is attached, by a chain of from 2 to 4 carbon atoms;

and $R^4$ is hydrogen, halogen, lower alkyl or lower alkoxy.

2. A compound as claimed in claim 1, in which $R^1$ is n-pentyl, n-hexyl, or cyclohexyl; $R^4$ is hydrogen or chlorine; and Y contains a single tertiary nitrogen atom separated from the oxygen atom by a two carbon chain, a total of from 6 to 9 carbon atoms and a methylene group attached to said oxygen atom.

3. A compound as claimed in claim 2 in which Y is 2-pyrrolidinomethyl, 2-piperidinoethyl, or 2-methylpiperidinylmethyl.

4. 1-[2-(2-cyclohexylvinyl)phenoxy]-2-pyrrolidinoethane.

5. 1-[4-chloro-2-(2-cyclohexylvinyl)phenoxy]-2-pyrrolidinomethane.

* * * * *